Sept. 8, 1970

O. PALINI 3,527,961

DIFFERENTIAL RESPONSE ANALYZING CIRCUIT FOR CONTROLLING
SUCH QUANTITIES AS VEHICLE SPEED

Filed June 29, 1967

INVENTOR,
OSCAR PALINI

BY Jacobi + Davidson

ATTORNEYS

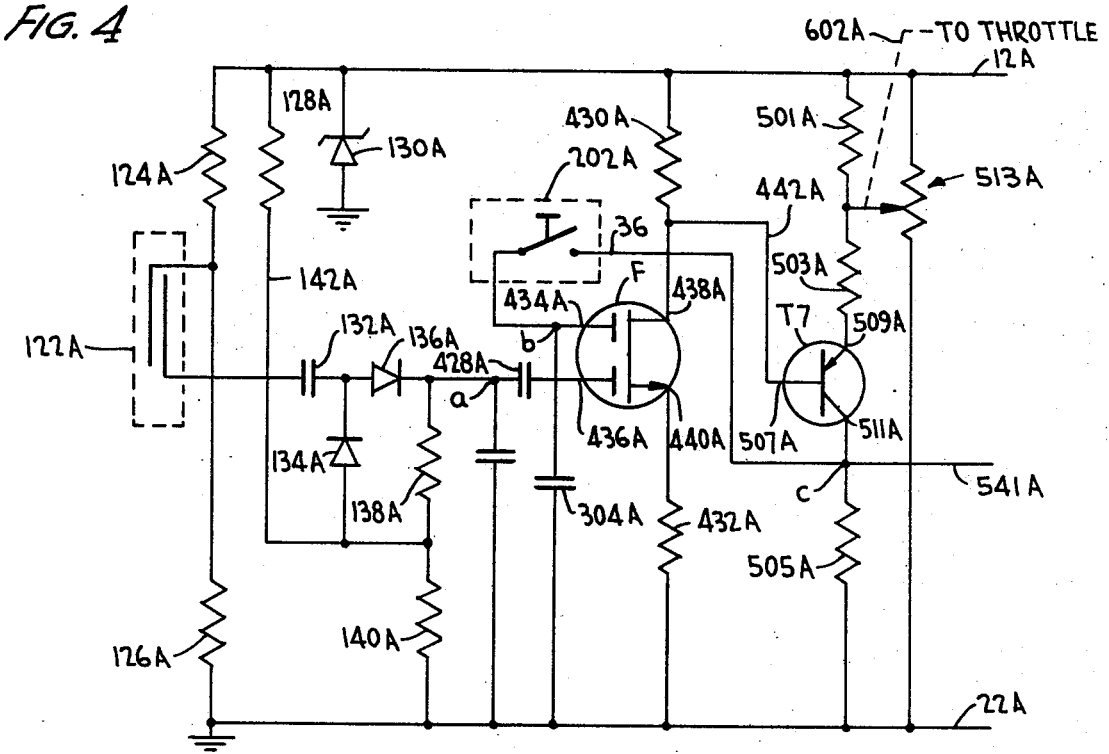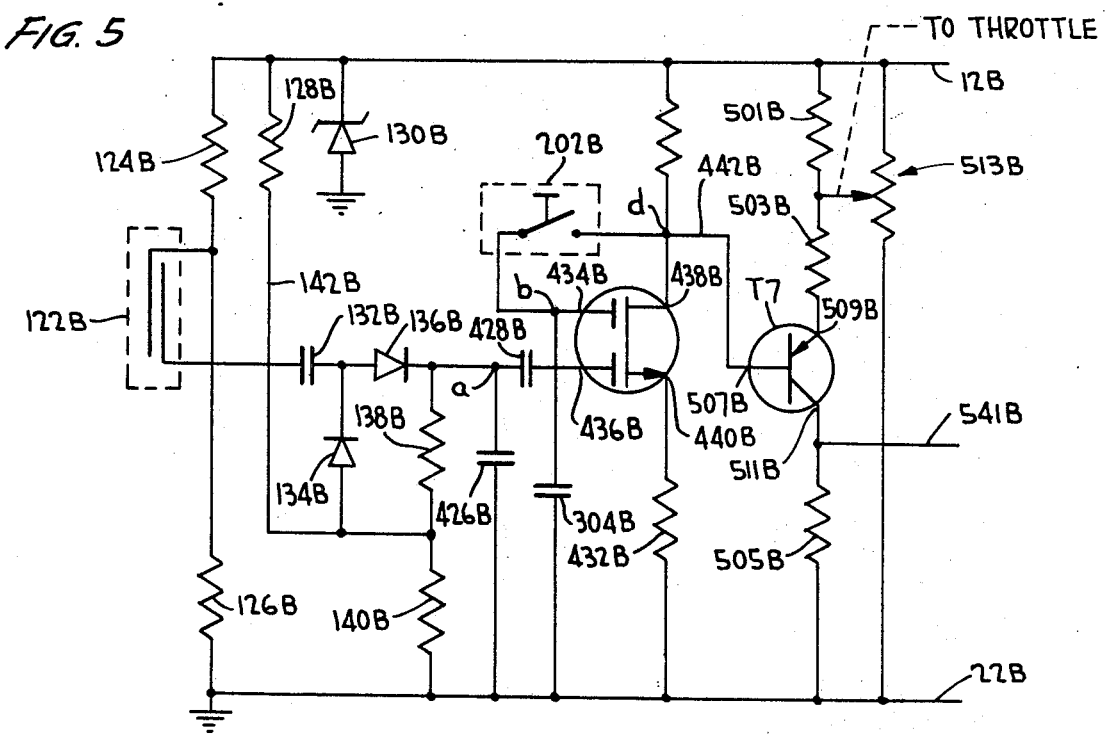

United States Patent Office 3,527,961
Patented Sept. 8, 1970

3,527,961
DIFFERENTIAL RESPONSE ANALYZING CIRCUIT FOR CONTROLLING SUCH QUANTITIES AS VEHICLE SPEED
Oscar Palini, Camp Spring, Md., assignor to U.S. Research Corp., Washington, D.C., a corporation of the District of Columbia
Filed June 29, 1967, Ser. No. 649,902
Int. Cl. H03k 5/20
U.S. Cl. 307—235                    9 Claims

ABSTRACT OF THE DISCLOSURE

A vehicle speed control system wherein an input signal representative of actual vehicle speed is compared with a reference signal representative of desired vehicle speed, the difference between the two signals producing an error voltage from a comparison amplifier. The error voltage is fed through amplification stages and then to a throttle position control device attached to the vehicle engine throttle. A feedback arrangement is coupled between the engine throttle and the amplification stages. The feedback arrangement monitors the throttle position and produces a throttle position biasing signal, this biasing signal being varied by the error voltage, whereby the engine throttle is adjusted about its biased position. The adjusted position of the throttle is also sensed and becomes a new biased position. The vehicle speed accordingly will likewise be adjusted until the actual vehicle speed substantially equals the desired vehicle speed, i.e., until the error voltage approaches zero. The reference signal representative of desired vehicle speed is derived from the input signal representative of actual vehicle speed through a set switch arrangement and is then stored on a reference storage capacitor. Thus, the set switch is depressed only when the vehicle has initially assumed a desired speed level, the speed control system then automatically maintaining said speed level.

BACKGROUND OF THE INVENTION

This invention generally relates to a vehicle speed control system which will automatically maintain the vehicle speed at a desired level, irrespective of varying road conditions.

The need for automatically controlling the speed of a vehicle such as an automobile has long been recognized in the prior art. The advent of high-speed automobiles and associated turnpikes and super-highways have made it feasible to relieve the vehicle driver from the necessity of maintaining foot pressure on the vehicle "gas pedal" to maintain vehicle speed. Oftentimes, and particularly on long highway trips, traffic conditions are such that a vehicle could be driven at constant speed without presenting a dangerous situation to the driver and to others on the road. Actually, it is generally recognized by highway authorities that a constant rate of speed for all the moving vehicles upon a highway effectively helps to reduce accident rates and resulting traffic fatalities.

Such automatic vehicle speed controls must be able to compensate for varying road conditions such as hills, curves and the like. Additionally, such vehicle speed control systems must be capable of being quickly de-activated when manual operation of the vehicle is again desirable or necessary.

Although many prior art speed control systems have been developed in an attempt to satisfy this need, such systems have not been wholly satisfactory. The primary difficulties encountered in the prior art devices relate to both stability of the system and to accuracy of the desired vehicle speed setting. Such difficulties particularly were evident in the pure mechanical versions of speed control systems since the many moving parts associated with such systems quickly became worn and quite unreliable. Accordingly, the prior art has advanced into the electronic speed control era thus eliminating much of the inefficiency and inaccuracy of the old mechanical systems.

Although the electronic systems are a vast improvement over the mechanical versions, many problems relating to stability and accuracy still remain. For example, an electronic system utilizing semiconductor components is extremely vulnerable to ambient temperature changes, these temperature changes producing gross differences in the operation of the speed control system from day to day. Fluctuations in battery supply voltage also change the characteristics of electronic speed control systems which results in unreliable operation.

Further difficulties are encountered in the prior art electronic speed control systems and the above difficulties are actually aggravated in that such electronic systems generally utilize a mechanical "desired speed" setting control or vernier. This control usually takes the form of a graduated potentiometer connected across the battery supply voltage, the voltage appearing at the "taps" of the potentiometer being utilized as a "reference" voltage representative of desired vehicle speed. As can easily be appreciated, if the vehicle battery voltage should fluctuate, the "reference" voltage would likewise fluctuate and thus change the vehicle speed in a highly undesirable manner. Such controls usually utilize a mechanical movable dial with reference speed indications thereon and present further inaccuracies during operation. Dial controls of this type must constantly be readjusted so that the speed indicated on the dial will correspond to the actual desired vehicle speed. If such readjustments are neglected, the system becomes highly inaccurate in a short period of time due to mechanical wear of the control dial and the like.

Accordingly, there still exists the need for an electronic vehicle speed control system which exhibits both a high degree of accuracy as well as stability.

The primary object of the present invention is to satisfy this need. Specific objects hereof include:

(a) The provision of an electronic speed control system that is unaffected by the changes in ambient temperature level;

(b) The provision of an electronic speed control system which is unaffected by changes in battery voltage level;

(c) The provision of an electronic speed control system wherein desired vehicle speed can be accurately set;

(d) The provision of an electronic speed control system which exhibits fail-safe operation;

(e) The provision of an electronic speed control system having a low cost of manufacture;

(f) The provision of an electronic speed control system wherein integrated semiconductor components are utilized;

(g) The provision of an electronic speed control system that is of small physical dimension; and (h) The provision of an electronic speed control system which can be easily installed into existing vehicles.

SUMMARY OF THE INVENTION

The instant invention contemplates the provision of a vehicle speed control system wherein an input signal representative of actual vehicle speed is compared with a reference signal representative of desired vehicle speed, the difference between the two signals producing an error voltage in a comparison amplifier. Unlike other electronic vehicle speed control systems, the instant invention derives the reference speed signal as a function of the instantaneous value of the actual speed signal and places the reference signal across a storage capacitor having one terminal connected to ground. A set switch is provided preferably between the reference storage capacitor and the terminal to which the input signal representative of actual vehicle speed is applied Accordingly, the set switch is actuated only when the actual vehicle speed is of a "desired" value, at which time the reference storage capacitor charges to a value substantially equal to the value of the input actual speed signal. The reference or "desired" vehicle speed is thus instantaneously set to substantially equal the actual vehicle speed at the time of actuation of the set switch.

The error voltage output from the comparison amplifier produced when actual speed differs from the "desired" or reference speed as set above is then fed through numerous amplification stages and finally to a throttle position control device attached to the vehicle engine throttle. A feedback arrangement is further provided between the engine throttle and the amplification stages. This feedback arrangement is responsive to the position of the engine throttle and produces a throttle position reference signal in the amplifying stages which biases the engine throttle to a quiescent position. Therefore, the amplified error signal serves to adjust the engine throttle about its quiescent or biased position, whereas the feedback arrangement continually readjusts the quiescent or biased position of the throttle to effect new biased throttle positions that will maintain the throttle setting when the "error" signal goes to zero. The system is further provided with both voltage regulating and temperature compensating means that bring about a high degree of stability in operation.

Actual vehicle speed, as appearing herein and in the appended claims, although aptly descriptive, is by no means to be considered as an absolute expression since, as will be appreciated, the accuracy of the input signal defined as representative of "actual" vehicle speed is affected by the usual, inherent errors and limitations of the vehicle speed measurement or sensing device utilized.

BRIEF DESCRIPTION OF THE DRAWINGS

The invention will be better understood and objects other than those set forth above will become apparent when consideration is given to the following detailed description. Such description makes reference to the annexed drawings presenting preferred and illustrative embodiments of the instant invention, and wherein:

FIG. 4 is an electrical circuit schematic of a further alternative embodiment of the speed control system; and FIG. 5 is an electrical circuit schematic of another alternative embodiment of the vehicle speed control system.

Like reference characters refer to like parts throughout the several views of the drawings.

DESCRIPTION OF THE PREFERRED EMBODIMENTS

Figure 1:
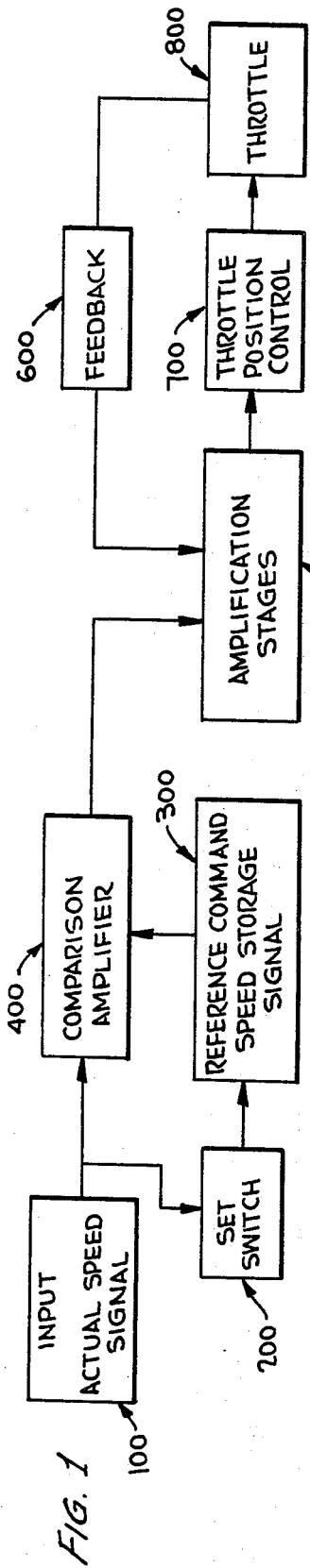
FIG. 1 is a functional block diagram of the vehicle speed control system as a whole.

Description of FIG. 1

Referring now to the drawings and to FIG. 1, there is disclosed a functional block diagram of the inventive vehicle speed control system. An input voltage signal proportional to the actual speed of the vehicle is produced within the INPUT block generally designated 100. On the other hand, a vehicle speed reference signal proportional to the "desired" speed of the vehicle is produced in the REFERENCE COMMAND SPEED STORAGE SIGNAL block generally designated 300. The desired speed reference signal is derived as a function of the signal appearing in block 100 whenever SET SWITCH generally designated 200 is actuated.

Both the input signal proportional to actual vehicle speed and the reference signal proportional to "desired" vehicle speed are then fed into a COMPARISON AMPLIFIER block generally designated 400. The output of the COMPARISON AMPLIFIER is an "error" signal that is representative of the difference between the value of the signal from block 100 and the reference signal produced in block 300. The output of the COMPARISON AMPLIFIER 400 is then fed into AMPLIFICATION STAGES generally designated 500..

AMPLIFICATION STAGES 500 provide an output signal to the THROTTLE POSITION CONTROL generally designated 700 that consists of two components. The first component of this output signal is a throttle condition or position reference signal which biases the engine THROTTLE 800 to a quiescent or steady-state level. The value of the throttle condition reference signal is determined by a FEEDBACK generally designated 600 which is connected between the THROTTLE 800 and AMPLIFICATION STAGES 500. The second component of the output of the AMPLIFICATION STAGES 500 is controlled by the "error" signal coming from COMPARISON AMPLIFIER 400 which serves to vary or "modulate" the throttle condition reference signal in accordance with the "error" signal value. Thus, the THROTTLE POSITION CONTROL 700 in response to the output of the AMPLIFICATION STAGES 500 will serve to both bias the engine THROTTLE 800 to a quiescent condition determined by the component comprising the throttle condition reference signal and to adjust the engine throttle about this biased condition in response to the "error" signal component.

General system operation

The general operation of the vehicle speed control system of FIG. 1 is typically as follows. Assuming the vehicle to be in motion at a given actual speed, an input signal proportional to said given actual speed would be produced within the INPUT 100. If the operator of the vehicle desires the vehicle to remain at this particular instantaneous given actual speed, he would then momentarily depress SET SWITCH 200 to produce a reference or desired speed signal in the REFERENCE COMMAND SPEED STORAGE SIGNAL block 300. The system now will operate automatically to maintain the given speed.

For example, if the vehicle speed either rises or falls from the reference or "desired" speed level, the input signal from block 100 would then become unbalanced with the reference signal from block 300 and the COMPARISON AMPLIFIER 400 would react by producing an "error" output signal. This output signal would be amplified in the AMPLIFICATION STAGES 500 and applied to the THROTTLE POSITION CONTROL 700 to vary the setting or position of the THROTTLE 800 to either speed up or slow-down the vehicle as required. As the THROTTLE 800 moves, the FEEDBACK arrangement 600 monitors or senses the new position of the throttle and serves to reset the throttle condition reference signal, i.e. the first component of the signal within the amplification stages 500, so that the THROTTLE 800 would be biased or maintained in the new position.

When the actual vehicle speed again equals the reference or desired vehicle speed, the value of the input signal from block 100 again substantially equals the value of the reference signal from block 300 and the COMPARISON AMPLIFIER 400 then effectively applies no "error" output. Thus, the THROTTLE 800 will remain in a new position as determined by the FEEDBACK arrangement 600 and this new throttle position will not vary until an "error" signal is again presented by the COMPARISON AMPLIFIER 400. As is evident, if the condition of the road upon which the vehicle is traveling varies, i.e. the vehicle approaches a hill or a down grade etc., the input signal from block 100 would again be unbalanced with the reference signal from block 300 producing an "error" signal from the COMPARISON AMPLIFIER 400 which again would serve to readjust the THROTTLE 800 about the biased or condition reference level as determined by FEEDBACK 600. Accordingly, the vehicle would again either speed-up or slow-down and the cycle would repeat itself.

Figure 2:
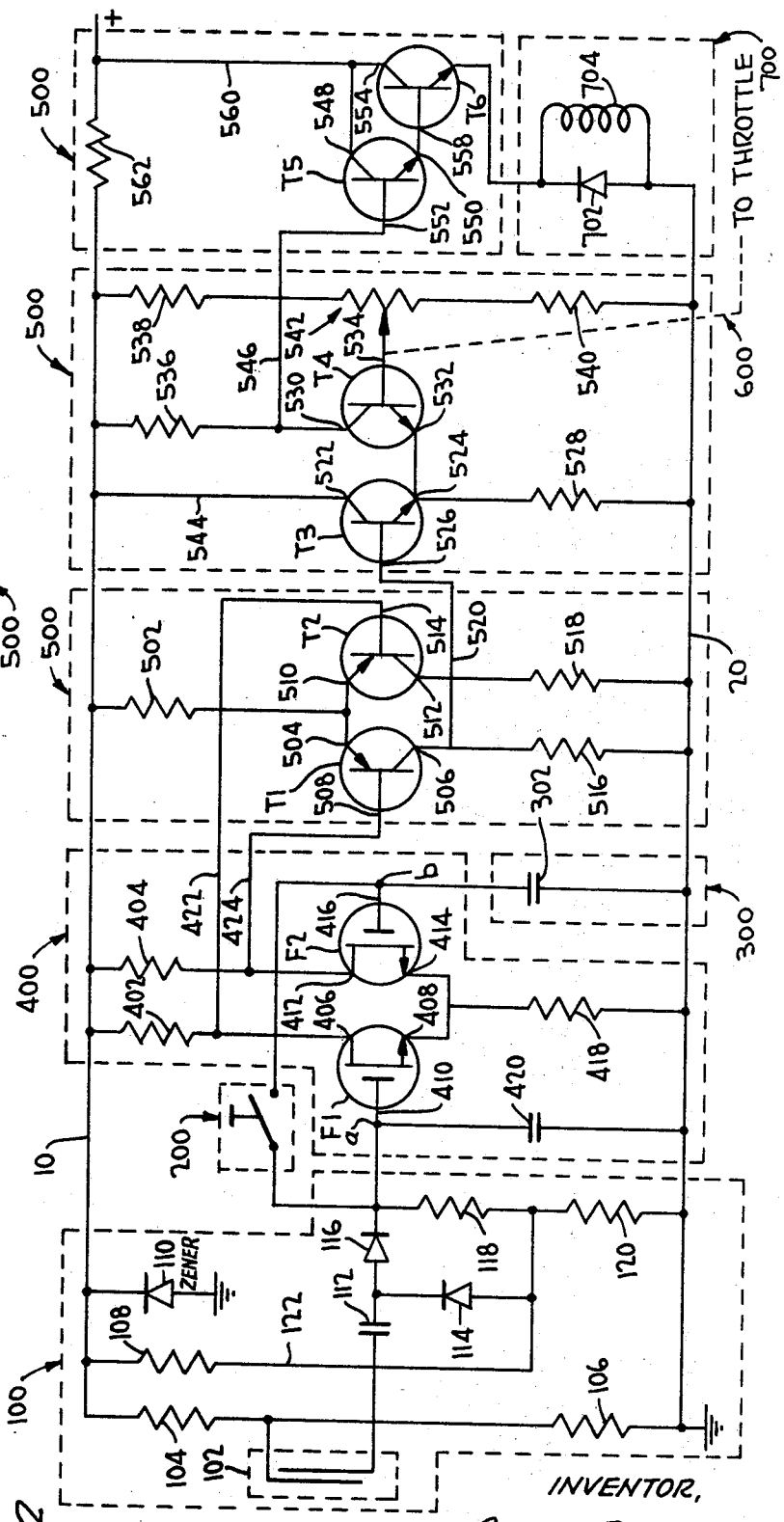
FIG. 2 is an electrical circuit schematic of a preferred embodiment of the speed control system.

Description of FIG. 2

Turning now to the actual circuitry utilized to perform the vehicle speed control function as described above, attention is directed to FIG. 2 in which a preferred embodiment can be broken down into its functional parts as above described by making reference to the portions of the complete circuit set off by the dotted lines. For example, the circuitry contained within the dotted lines designated 100 serves to produce an input signal proportional to the actual vehicle speed. The portion of the circuitry contained within dotted lines generally designated 300 serves to provide the reference command speed storage signal proportional to the "desired" vehicle speed. This reference signal is derived from the input signal through a set switch contained within the dotted lines generally designated 200.

Both the input signal proportional to actual vehicle speed and the reference signal proportional to "desired" vehicle speed is applied to a comparison amplifier circuit contained within dotted lines generally designated 400. The output of the comparison amplifier circuit 400 is plied through various amplification stages contained within dotted lines generally designated 500, the output of which is then applied to the throttle position control schematically depicted within the dotted lines generally designated 700. Although not shown in this figure of the drawings, the actual engine throttle 800 is controlled in any suitable manner by the throttle position control 700. Additionally, a feedback link shown in dotted lines generally designated 600 is connected between the engine throttle and the amplification stages 500. Electrical power for the circuit of FIG. 2 is supplied through a non-illustrated battery or other voltage source connected between positive terminal 10 and negative terminal or ground 20.

The actual vehicle speed is sensed through a sensing mechanism 102 which may comprise a make-and-break switch such as is illustrated or, alternatively, a magnetic pulser. Sensor 102 is connected between a voltage divider composed of resistors 104 and 106, the output of the sensor 102 having a frequency directly proportional to the actual speed of the vehicle and having a voltage level of between 1 and 3 volts as determined by the voltage divider 104–106. Sensor 102 can be attached, for example, to the transmission, speedometer, or driving wheels of the vehicle such that a direct relation between actual vehicle speed and actuation of the sensor 102 is obtained.

The voltage pulses of varying frequency from the sensor 102 are applied through an "integrator" circuit comprised of capacitor 112, resistor 108, diodes 114 and 116, voltage divider 118–120, and input capacitor 420. Since the magnitude of the pulses produced by the actual vehicle speed sensor 102 remains constant due to Zener diode 110 connected across the battery supply terminals 10 and 20, the voltage across capacitor 420 will rise to a level proportional to the frequency of pulses produced by the sensor 102. This voltage across capacitor 420 is applied to a gate terminal 410 of a field-effect transistor $F_1$.

A set switch 200 is connected between point $a$ of the input circuit 100 and a storage capacitor 302 of the reference or "desired" speed circuit 300. When the set switch 200 is depressed, the voltage appearing across capacitor 420 will be applied through the set switch 200 to charge reference speed storage capacitor 302 connected between gate terminal 416 of field-effect transistor $F_2$ and the ground terminal 20. Accordingly, when set switch 200 is again opened, the voltage appearing at terminal $a$ will be equal to the voltage appearing at terminal $b$, i.e. the two inputs comprised of the actual vehicle speed signal and the reference or "desired" vehicle speed signal to the comparison amplifier 400 will be balanced.

Comparison amplifier 400 consists of the two field-effect transistors $F_1$ and $F_2$, the "source" electrodes 406 and 412 of these transistors being connected to the positive conductor 10 respectively through resistors 402 and 404. Drain electrode 408 of field-effect transistor $F_1$ is coupled with drain electrode 414 of field-effect transistor $F_2$, both drain electrodes being connected to the negative terminal 20 of the power supply through resistor 418. Although field-effect transistors are utilized in this preferred embodiment, the instant invention contemplates the use of other high input-impedance devices such as vacuum tubes or the like. The output of the comparison amplifier 400 is applied through conductors 422 and 424 to amplifier 500.

The amplifier 500 is preferably constructed such that it consists of three stages as shown. The first stage of the amplifier is constructed similar to a "camparison" or "differential" amplifier as it comprises two transistors $T_1$ and $T_2$, the respective emitter electrodes 504 and 510 of which are connected to the positive supply terminal 10 through resistor 502. On the other hand, the collector electrode 506 of transistor $T_1$ is connected through a resistor 516 to the negative or ground terminal 20 while the collector terminal 512 of transistor $T_2$ is connected through a resistor 518 to the ground terminal 20. Conductor 422 from the comparison amplifier 400 is connected to the base electrode 514 of transistor $T_2$ while conductor 424 from the comparison amplifier 400 is connected to the base 508 of transistor $T_1$. The particular configuration of transistor $T_1$ and $T_2$ is such that temperature compensation is obtained. The output of this first amplification stage is taken from the collector electrode 506 of transistor $T_1$ through conductor 520. This output is a temperature compensated, amplified "error" signal.

The amplified "error" signal appearing on conductor 520 is then applied through the second amplification stage comprising transistors $T_3$ and $T_4$. The collector electrode 522 of transistor $T_3$ is connected through conductor 544 to the positive terminal 10. The emitter 524 of transistor $T_3$ is connected through a voltage dropping resistor 528 to ground. The amplified "error" signal output coming from the preceding stage is applied to the base 526 of transistor $T_3$. Transistor $T_4$ is connected via its emitter electrode 532 with the emitter electrode 524 of transistor $T_3$. The collector 530 of transistor $T_4$ is connected to the positive terminal 10 through a resistor 536. Transistor $T_4$ is biased into a conducting mode through a variable resistor 542 connected in the circuit branch including resistors 538 and 540 across the battery terminal conductors 10 and 20. Thus, the conduction of transistor $T_4$ is controlled through its base by the setting of variable resistor 542 and also through conduction of transistor $T_3$, the emitter 524 of which being connected to the emitter 532 of transistor $T_4$. Variable resistor 542 is controlled through a mechanical or electrical coupling schematically illustrated in dotted lines 600 connected to the engine throttle.

The output of this second amplification stage is applied to a still further third amplification stage comprising transistors $T_5$ and $T_6$ connected in Darlington configuration through output conductor 546. Conductor 546 is connected to the base 552 of transistor $T_5$ whose collector and emitter electrodes, respectively depicted as 548 and 550, are connected across the collector 554 and base 558 terminals of transistor $T_6$. Transistors $T_5$ and $T_6$ serve as a variable electrical switch connected to the voltage source through conductor 560 and a throttle position controlling load 700. Resistor 562 also included in this last amplification stage serves to drop the battery voltage to the stages.

The throttle position controlling load 700 is schematically illustrated as comprising a parallel connection of a diode 702 and an inductor 704. This load 700, however, would in practice be an electrical solenoid connected to the throttle or, alternatively, would be a "vacuum transducer" or the like. The exact configuration of the throttle position controlling load forms no part of the present invention since the only requirement is a transducer device that converts an electrical signal into a mechanical movement to control the setting or position of the engine throttle.

Operation of the circuit of FIG. 2

Having now described the detailed structure of the preferred embodiment of FIG. 2, the operation and function of same is as follows. Initially, it is assumed that the vehicle in which the speed control system is installed is in motion at some given speed. Sensor 102, preferably connected to the speedometer cable, transmission or the like of the vehicle, will be actuated in a manner directly proportional to the actual speed of the vehicle. Accordingly, sensor 102 will apply pulses of varying frequency proportional to the vehicle speed and of a magnitude between 1 and 3 volts to the series line capacitor 112, diodes 114 and 116, and voltage divider 118 and 120. Diodes 114 and 116, of course, serve to transmit both positive and negative half-cycles of the output from the sensor 102. The voltage across the voltage divider 118 and 120 is also impressed across input capacitor 420 connected in parallel with same. Accordingly, the voltage at point $a$ will build-up to a magnitude proportional to actual vehicle speed, this voltage being a function of the frequency of the output from the sensor 102 since the magnitude of the sensor output remains constant due to the Zener diode 110 connected across the supply terminals 10 and 20. The voltage at point $a$ is connected to gate 410 of field-effect transistor $F_1$ of the comparison amplifier 400.

If the operator of the vehicle decides that this actual vehicle speed should be maintained as the "desired" or reference speed, the operator would momentarily depress set switch 200. When set switch 200 is depressed, the voltage appearing at point $a$ is immediately transferred to the reference storage capacitor 302, this storage capacitor charging to the value of the voltage at point $a$ until the value of the voltage at point $b$ equals the value of the voltage at point $a$. The set switch is then released and the system will function automatically. As shown on the drawing, the voltage appearing at point $b$ is applied directly to the gate 416 of field-effect transistor $F_2$ of comparison amplifier 400.

At this point, the engine throttle 800 is biased or maintained in a quiescent state as determined by the position of the engine throttle through feedback means 600 connected to the variable resistor 542 in the second stage of the amplifier 500. As is evident, transistor $T_4$ of the second stage of amplifier 500 will conduct a current through resistor 536, collector and emitter electrodes 530 and 532 respectively, and resistor 528 depending upon the biasing voltage applied to the base 534 through the variable resistor 542. The output appearing on conductor 546 is the throttle condition reference signal as determined merely by the position of the engine throttle and not the "error" voltage from the comparison amplifier. The voltage appearing on conductor 546 serves to bias the Darlington configuration of transistors $T_5$ and $T_6$ into a slight conductive state such that the throttle position control load 700 maintains the engine throttle in a steady-state or quiescent position sufficient to initially maintain the vehicle speed.

Now, assuming that the vehicle is slowed down due to a change in road condition such as the approach of a hill, the output from actual speed sensor 102 will decrease and the voltage appearing at point $a$, one input of the comparison amplifier, will decrease proportionally. However, the voltage appearing at point $b$, indicative of the "desired" or reference vehicle speed, will remain constant since this reference signal is stored on storage capacitor 302 connected between the gate 416 of field-effect transistor $F_2$ and ground conductor 20. The voltage across storage capacitor 302 remains constant since the only discharge path for this storage capacitor is through the gate electrode of the field-effect transistor $F_2$, an extremely high-impedance path. In actual operation it has been found that the reference or "desired" speed signal stored across capacitor 302 will remain constant for upwards of 30 hours.

Since the voltage at point $a$ has now become less than the voltage at point $b$, comparison amplifier 400, in normal fashion, becomes unbalanced. Since the greater voltage appears at the gate 416 of field-effect transistor $F_2$, this transistor will begin to conduct more heavily. Accordingly, more current flows through the path consisting of resistor 404, field-effect transistor $F_2$ and resistor 418. Since more current flows through this path, the voltage appearing at the output conductor 424 is decreased considering the increased voltage drop across resistor 404. Since comparison amplifier output conductor 424 is connected directly to the base electrode 508 of the first stage amplifying transistor $T_1$, the conduction of transistor $T_1$ will be varied in accordance with this voltage change. Since transistor $T_1$ is of the PNP variety, a decrease in voltage to its base 508 serves to increase the current output through the collector-emitter path 504-506. This increased current output is reflected as an increase in the voltage appearing at conductor 520 tapped across resistor 516.

Conductor 520 leads into the second stage of the amplifier 500 and is connected directly to the base 526 of transistor $T_3$. Transistor $T_3$, on the other hand, is a NPN transistor so that an increase in voltage appearing at the base 526 from conductor 520 serves to increase the conduction along the collector-emitter path 522-524 of transistor $T_3$. Accordingly, since current likewise increases through the resistor 528, the voltage appearing at the emitter 532 of the next transistor $T_4$ would increase proportionally.

Note, however, that the base 534 bias to transistor $T_4$ has been initially set by the position of the variable resistor 542 as controlled by the feedback arrangement 600 connected to throttle 800. Therefore, since the base voltage of transistor $T_4$ is initially maintained constant, an increase in emitter voltage at the emitter 532 serves to decrease the current flow through transistor $T_4$, this transistor being of the NPN variety. A decrease in current through transistor $T_4$ serves to raise the voltage appearing at conductor 546 tapped across the resistor 536. This output conductor 546 leads into the final stage of amplifier 500. Lastly, transistor $T_5$ in the final stage of amplifier 500 is of the NPN variety and conductor 546 connects directly into the base 552 of transistor $T_5$. Since the voltage appearing at conductor 546 is now increased in direct proportion to the unbalanced in the comparison amplifier 400, transistor $T_5$ will conduct more heavily, biasing output transistor $T_6$ connected in Darlington configuration to a higher current output. Accordingly, throttle position control 700 receives a greater current flow to effect an adjustment at the engine throttle 800, in this case to open the throttle 800 to a wider position.

When the throttle 800 is opened to a wider position, feedback arrangement 600 senses this new position and adjusts variable resistor 524 accordingly to adjust the throttle condition biasing or reference signal. Soon, the actual vehicle speed will be increased such that it is equal to the reference or "desired" vehicle speed. There will be no longer be an output from comparison amplifier 400 and the entire speed control system will again be at "rest," but with the engine throttle 800 biased to a new position by virtue of variable resistor 542 such that the vehicle can again initially maintain this desired speed until another change in road condition occurs.

Of course, if the vehicle had approached a downhill grade resulting in an increase in the voltage appearing at point $a$ over and above the value of the voltage appearing at point $b$, the operation of the vehicle speed control system would take place in a fashion similar to that described above but with the adjusting current to the throttle position control 700 being decreased rather than increased.

Although not illustrated on any of the drawings, a release or disconnect switch would be included in the system as is obvious to one of ordinary skill in the art. For example, a latching relay could be placed in series between the power supply and conductor 10, the relay being actuated whenever the set switch 200 is depressed. The relay winding would additionally be connected to the brake light switch of the controlled vehicle such that whenever the brake pedal is depressed, the relay is automatically released and will remain in such a disconnected state until the set switch 200 is again depressed. The particular placement and operation of such a release or disconnect arrangement is in no way critical to the operation of the speed control system as a whole.

Figure 3:
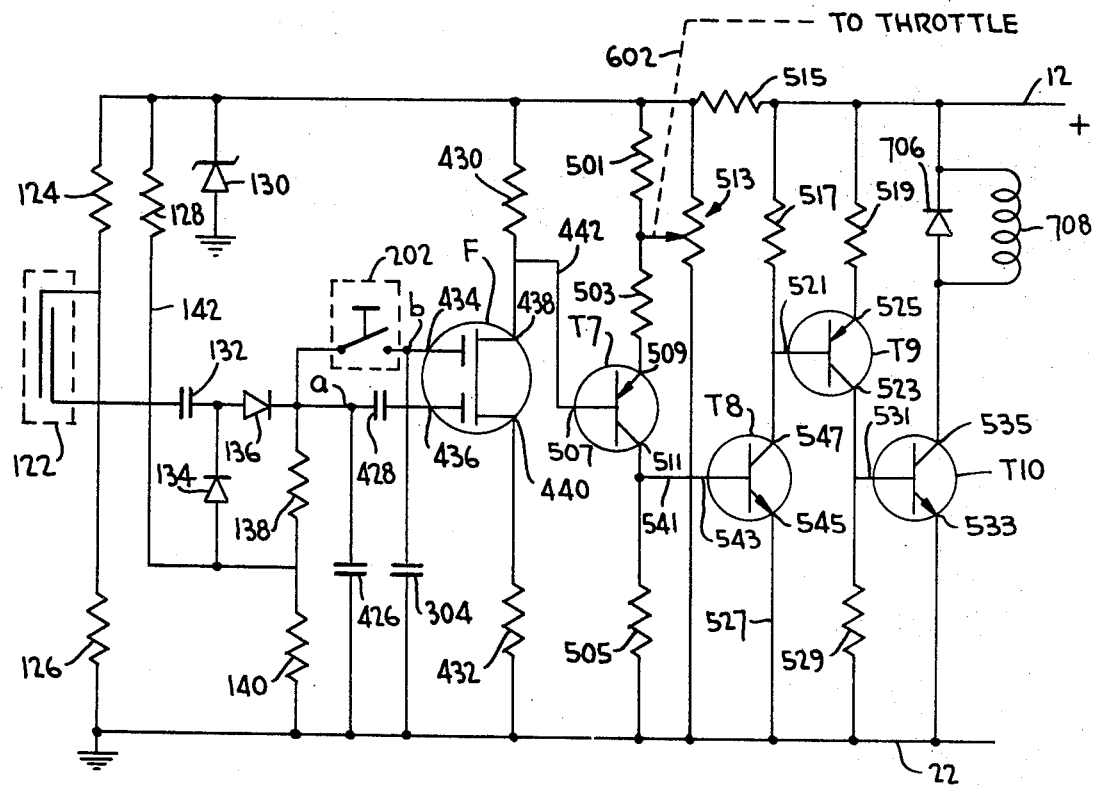
FIG. 3 is an electrical circuit schematic of an alternative embodiment of the speed control system.

Description of FIG. 3

FIG. 3 depicts schematically an alternative embodiment of the preferred circuit as described with respect to FIG. 2. The invention as depicted in FIG. 3 makes use of an integrated dual-gate field-effect transistor F comparison amplifier as opposed to the plurality of individual field-effect transistors described above. Additionally, the amplification stages 500 of the circuit depicted in FIG. 3 have been modified so as to operate in a highly efficient manner in conjunction with the integrated dual-gate field-effect transistor. The input or actual vehicle speed signal circuit of FIG. 3 is identical to that disclosed in FIG. 2 with the exception that an input capacitor 428 is placed in series with the actual speed signal gate 436 of integrated field-effect transistor F. As discussed above, sensor 122 produces an output signal whose frequency is directly proportional to the actual speed of the vehicle. This output signal passes through capacitor 132, is full-wave rectified by diodes 134 and 136, and is "integrated" in a stepwise fashion by the parallel combination of voltage divider 138–140 and input storage capacitor 426. Accordingly, as in the embodiment of FIG. 2, a voltage appears at point $a$ that is directly proportional to the actual vehicle speed, this voltage being derived from the frequency of input pulses from sensor 122, the magnitude of said input pulses being fixed through voltage divider 124–126 connected across the supply lines 12 and 22 in cooperation with a shunting voltage-limiting Zener diode 130. The voltage appearing at point $a$ is applied through series capacitor 428 to one of the gates 436 of the dual-gate field-effect transistor F. Thus, the actual vehicle speed signal serves as one input to the integrated comparison amplifier 400 as shown in FIG. 1.

When the actual vehicle speed reaches a desired value such that the operator of the vehicle wishes to automatically maintain same, the operator would momentarily depress set switch 202 and charge the reference or "desired" speed storage capacitor 304 to the value of the voltage appearing at point $a$. When storage capacitor 304 has become charged, the voltage appearing at point $b$ which is directly connected to the other gate 434 of the integrated dual-gate field-effect transistor F, is equal to the voltage at point $a$ and the comparison amplifier is "balanced."

Even when the comparison amplifier is balanced, a measured output will be apparent at conductor 442 since the field-effect transistor F will conduct an amount of current through resistor 430, source and drain electrodes 438 and 440 respectively, and resistor 432. The voltage appearing at conductor 442 is applied to the base 507 of a PNP transistor $T_7$. This transistor will, accordingly, conduct current through its emitter-collector path of a value determined both by the level of voltage at its base 507 and by the value of the emitter biasing resistors 503 and 501. Connected in parallel to the conductive path of transistor $T_7$ is a variable resistor 513 controlled by the position of the engine throttle 800 through feedback arrangement 602 as discussed with respect to FIG. 2 above. The setting of the variable resistor 513 changes the emitter bias to the emitter 509 of transistor $T_7$, and accordingly serves to control the conduction current through transistor $T_7$ as a function of throttle position. The amount of current flowing through resistors 501 and 503, emitter-collector path 509–511 and resistor 505 is therefore controlled by the position of the engine throttle through the feedback arrangement 602 and variable resistor 513 to produce at conductor 541 a throttle position or condition reference output signal. As discussed above, this throttle position or condition reference signal serves to bias the engine throttle and maintain same in a quiescent state without the presence of an "error" signal from the comparison amplifier. The value of the throttle condition reference voltage appearing on conductor 541 is amplified in a normal manner through transistors $T_8$, $T_9$, and $T_{10}$ and is eventually applied to the throttle position control load again schematically illustrated as comprising a diode 706 and an inductor 708.

Operation of the circuit of FIG. 3

Describing now the operation of the speed control system depicted in FIG. 3, it will again be assumed that the vehicle has approached a change in road condition, such as a hill, which would serve to slow down the vehicle. When the vehicle slows down, the output of sensor 122 proportionally decreases to thus decrease the voltage appearing a point $a$ and accordingly decrease the voltage input to gate 436 of the dual-gate field-effect transistor F. Since the voltage appearing at the other gate 434 of the field-effect transistor F remains constant due to the stored charge across the reference speed storage capacitor 304, field-effect transistor F will become "unbalanced" increasing the current flowing through the conductive path of the field-effect transistor F which includes resistors 430 and 432. Since the current flow through resistor 430 increases in proportion to the unbalance appearing at gates 434 and 436 of the field-effect transistor F, the voltage appearing at conductor 442 tapped to resistor 430 will decrease reflecting the increased voltage drop across resistor 430. Conductor 442, being directly connected to the base 507 of PNP transistor $T_7$, will serve to bias transistor $T_7$ to a higher state of conduction increasing the current flow through the emitter-collector path 509–511 and, of course, through resistor 505. Accordingly, the voltage appearing at conductor 541 tapped from resistor 505 will increase, this increased voltage being directly applied to the base 543 of NPN transistor $T_8$.

In a similar fashion, transistor $T_8$ will become more conductive allowing a greater amount of current to flow through the path consisting of resistor 517, collector 547, emitter 545, and conductor 527 to the ground conductor 22. This increased current flow increases the voltage drop across resistor 517 and, accordingly, decreases the value of the voltage sensed by the base electrode 521 of transistor $T_9$. However, since transistor $T_9$ is of the PNP variety, the decreased voltage appearing at its base 521 serves to place transistor $T_9$ in a state of higher conduction, allowing greater current flow through the path consisting of resistor 519, emitter 525, collector 523, and resistor 529. Similarly, since greater current is now flowing through resistor 529, the value of voltage sensed by the base 531 of power transistor $T_{10}$ increases, driving power transistor $T_{10}$ to a higher conductive state, transistor $T_{10}$ being of the NPN variety. Finally, since transistor $T_{10}$ is switched to a higher conductive state, current flow through the throttle position control load schematically illustrated as diode 706 and inductor 708 is increased, causing the throttle position control load to open the setting of the throttle, i.e. to adjust the throttle about the position initially set by the throttle condition reference biasing signal.

The adjustment of the engine throttle to a more open position naturally will effect an increase in the actual vehicle speed until such time as the actual vehicle speed is substantially equal to the reference or "desired" vehicle speed, i.e. the voltage appearing at gates 436 and 434 of the dual-gate field-effect transistor F becomes equal. However, as the engine throttle is moving, the position assumed by the engine throttle is sensed by the feedback 602 which serves to continually readjust variable resistor 513 and thus readjust the throttle condition reference signal such that the throttle assumes a new biased position.

Although the above operation has been described for the situation in which a vehicle approaches an uphill grade and thus slows down, it will be appreciated by those skilled in the art that a similar operation of the vehicle speed control system would take effect if the vehicle approached a down-grade and thus attempted to speedup above the setting of the "desired" or reference vehicle speed. The only difference in this latter case would be that the throttle position control load would be subjected to a decrease in current so as to adjust the throttle to a more closed position and thus slow down the vehicle.

Description of FIG. 4

FIG. 4 is an electrical circuit schematic of an alternative embodiment of the speed control system utilizing a dual-gate field-effect transistor as was described in FIG. 3. The component parts of the circuit of FIG. 4 that are the same as described above with respect to FIG. 3 are marked with the same reference numerals but with the suffix A added thereto. The arrangement of FIG. 4 differs from that of FIG. 3 only in the manner in which the "desired" or reference speed signal is stored on the storage capacitor 304A. In FIG. 4, set switch 202A is connected between the storage capacitor 304A and point $c$ in the output of the first amplification stage transistor $T_7$. This is in contrast to the connection of the set switch 202 of FIG. 3, in which figure the set switch was directly connected to the actual speed signal input at point $a$.

The operation of the circuit of FIG. 4, as mentioned above, is identical to that of FIG. 3. However, the charging of the reference speed storage capacitor 304A takes place as follows. Assuming that the vehicle is proceeding at some given actual speed, sensor 122A produces a signal whose frequency is proportional to said actual speed, this signal being rectified, "integrated," and finally applied across input capacitor 424A. The voltage appearing across input capacitor 426A is applied through a series capacitor 428A connected to point $a$ and to the gate 436A of field-effect transistor F.

Now, when the operator of the vehicle desires that the instantaneous actual vehicle speed be utilized as the "desired" or reference vehicle speed, the operator momentarily would depress set switch 202A to instantaneously connect the reference storage capacitor 304A to point $c$ via conductor 36. A voltage will be apparent at point $c$ at this time due to the instantaneous "unbalance" of the comparison amplifier and due to the normal conduction of transistor $T_7$ as discussed above. Since storage capacitor 304A is connected via point $b$ to gate 434A of the field-effect transistor F, capacitor 304A will charge to a value at which the voltage appearing at point $b$ compared to the voltage appearing at point $a$ produces a balanced or null output. At this time, the field-effect transistor F comprising the comparison amplifier will have a "balanced" input and the value of the "desired" or reference speed signal will thereby become fixed. The vehicle speed control system as alternatively depicted in FIG. 4 will then function in the manner of the system of FIG. 3.

Description of the circuit of FIG. 5

FIG. 5 discloses another modification of the circuit of FIG. 3, this modification also pertaining to the means utilized to charge the reference storage capacitor 304. Again, all components in FIG. 5 that are identical to those disclosed in FIG. 3 are marked with the same reference numeral but with the suffix B added thereto. In FIG. 5, set switch 202B is connected between the storage capacitor 304B as in FIGS. 3 and 4, but the other terminal of set switch 202B is directly connected to point $d$ in the output conduction path of dual-gate field-effect transistor F. As discussed above, the actual vehicle speed input capacitor 426B will be charged by the pulses produced in the speed sensor 122B to a value proportional to the actual vehicle speed. This voltage level would then appear at point $a$ and be reflected through capacitor 428B to gate 436B of field-effect transistor F.

If the operator of the vehicle wishes to maintain this actual vehicle speed as the "desired" or reference vehicle speed, the operator would then momentarily depress set switch 202B which instantaneously connects reference storage capacitor 304B to point $d$ in the output conduction path comprising resistor 430B, source and drain electrodes 438B and 440B respectively, and resistor 432B. Accordingly, capacitor 304B would charge to a value such that the voltage appearing at point $b$ is equal to the voltage appearing at point $a$. In other words, reference storage capacitor 304B would charge until such time as the voltages at gates 434B and 436B of the dual-gate field-effect transistor F are equal and a balanced or null output is produced. Set switch 202B would then be released and the reference charge stored across the reference storage capacitor 304B would remain constant serving as the reference vehicle speed for comparison purposes. The remainder of the operation of the system disclosed in FIG. 5 would then take place as described in connection with the system of FIG. 3.

From the foregoing description, it should be readily apparent that the objects set forth at the outset of this specification have been successively achieved. Accordingly what is claimed is:

1. A control signal producing circuit, said circuit comprising:
   a comparison amplifier means having a first and second input and an output;
   means for applying a varying signal to said first input; and
   means for applying a constant reference signal to said second input, said means including a storage capacitor connected to said second input and charged to the value of said constant reference signal, said means for applying a contsant reference signal to said second input deriving said constant reference signal as a function of said varying signal:
   electrical biasing means connected across said comparison amplifier means, said biasing means including a conductor connected to ground, said storage capacitor being connected between said second input and said grounded conductor;
   said comparison amplifier means including an integrated dual gate field-effect transistor having gate electrodes respectively connected to said first and second inputs and having at least one source electrode and drain electrode, said biasing means being connected across said at least one source electrode and drain electrode;
   whereby said first and second signals are compared and an error control signal is produced at said output.

2. A control signal producing circuit according to claim 1, wherein said means for applying a constant reference signal to said second input includes a set switch means connected between said first input and said storage capacitor.

3. A control signal producing circuit according to claim 1, wherein said means for applying a varying signal to said first input includes an integrator circuit means for integrating said varying signal.

4. A control signal producing circuit according to claim 3, wherein said biasing means includes a regulated voltage source.

5. A control signal producing circuit according to claim 3, wherein the instantaneous peak value of said varying signal is stored in an additional capacitor connected between said first input and said grounded conductor of said electrical biasing means.

6. A control signal producing circuit, said circuit comprising:
   a comparison amplifier means having a first and second input and an output;
   means for applying a varying signal to said first input; and
   means for applying a constant reference signal to said second input, said means including a storage capacitor connected to said second input and charged to the value of said constant reference signal, said means for applying a constant reference signal to said second input deriving said constant reference signal as a function of said varying signal;
   electrical biasing means connected across said comparison amplifier means, said biasing means including a conductor connected to ground, said storage capacitor being connected between said second input and said grounded conductor;
   said means for applying a constant reference signal to said second input including a set switch means connected between said storage capacitor and said output;
   whereby said first and second signals are compared and an error control signal is produced at said output.

7. A control signal producing circuit according to claim 6, wherein said comparison amplifier means includes a field-effect transistor means having two gate electrodes, said gate electrodes being respectively coupled to said first and second inputs; said storage capacitor being connected to said gate electrode coupled with said second input.

8. A control signal producing circuit according to claim 6, wherein said comparison amplifier means includes a field-effect transistor means having gate electrodes respectively connected to said first and second inputs and having at least one source electrode and drain electrode, said biasing means being connected across said at least one source electrode and drain electrode.

9. A control signal producing circuit according to claim 8, wherein said field-effect transistor means comprises a pair of field-effect transistors.

References Cited

UNITED STATES PATENTS

| | | | |
|---|---|---|---|
| 2,836,797 | 5/1958 | Ozarow | 307—205 XR |
| 2,959,710 | 11/1960 | Young | 315—169 |
| 3,260,951 | 7/1966 | Kaye | 330—29 |
| 3,277,312 | 10/1966 | Harris | 307—235 |
| 3,348,065 | 10/1967 | Schmidt | 307—235 XR |
| 3,431,508 | 3/1969 | Soltz et al. | 330—30 |

DONALD D. FORRER, Primary Examiner

J. ZAZWORSKY, Assistant Examiner

U.S. Cl. X.R.

307—304; 328—146, 151; 330—30